July 10, 1951 — R. J. OLANDER — 2,559,731
FRICTION SHOCK ABSORBER FOR RAILWAY CAR TRUCK SPRINGS
Filed July 19, 1948 — 2 Sheets-Sheet 1
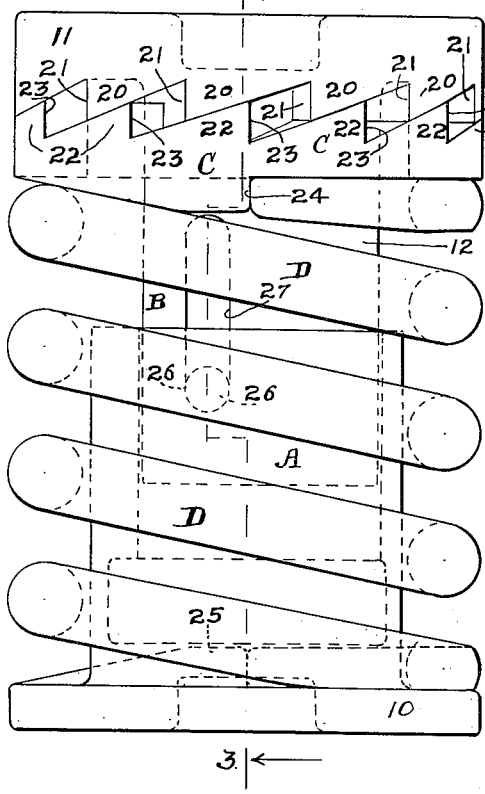
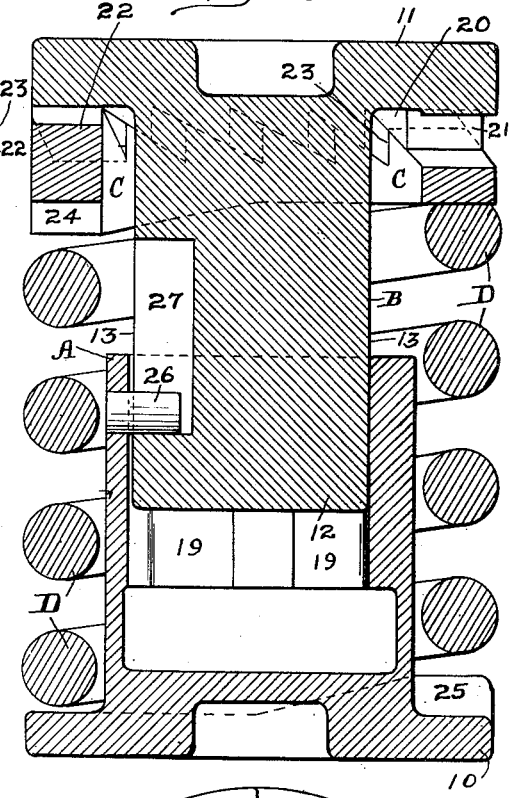
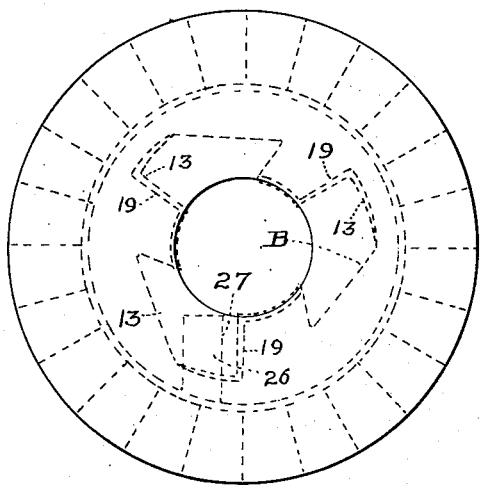
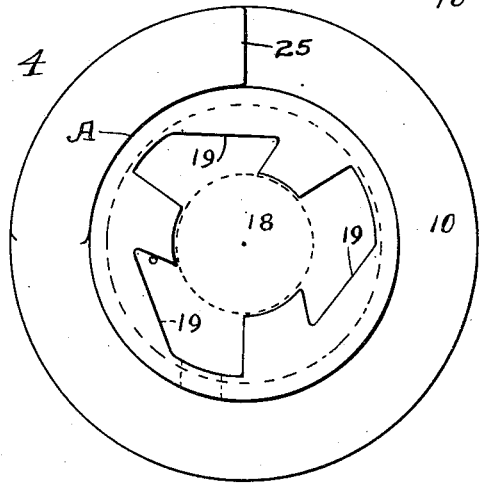
Inventor,
Roland J. Olander.
By Henry Fuchs.
Atty.

July 10, 1951  R. J. OLANDER  2,559,731
FRICTION SHOCK ABSORBER FOR RAILWAY CAR TRUCK SPRINGS
Filed July 19, 1948  2 Sheets-Sheet 2
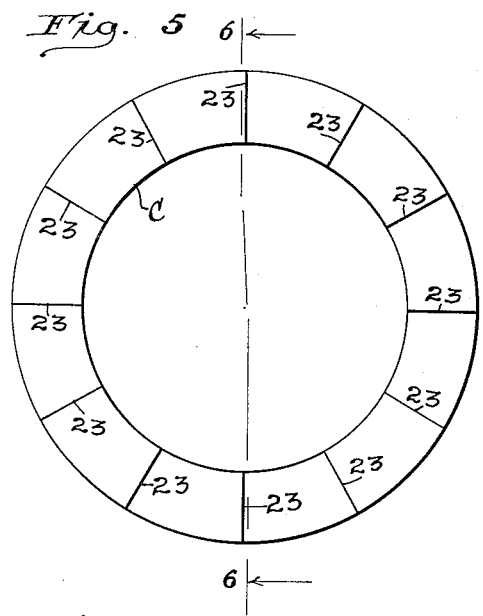
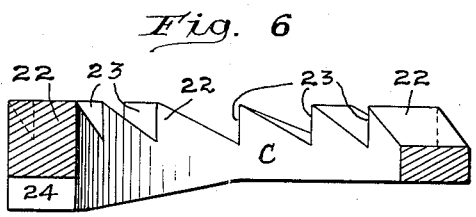
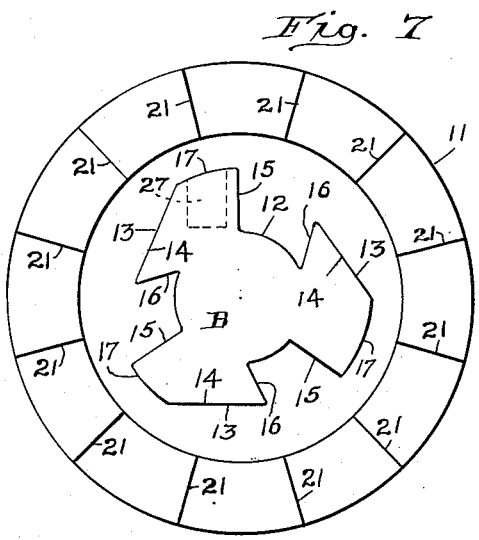
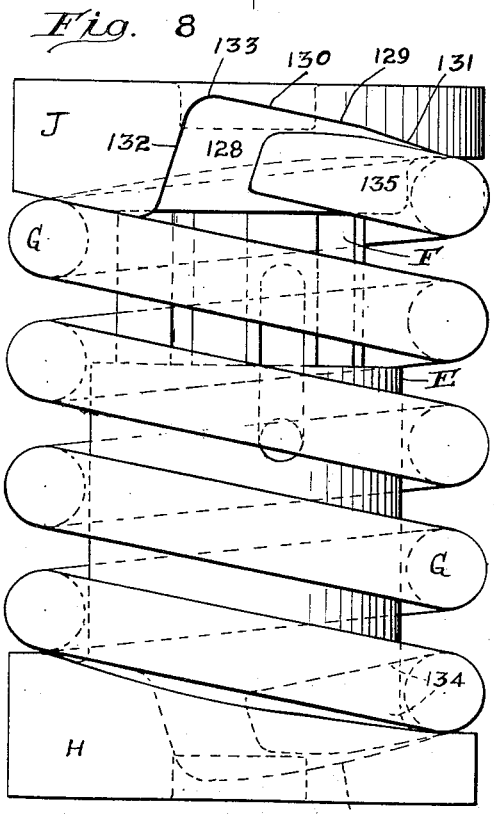
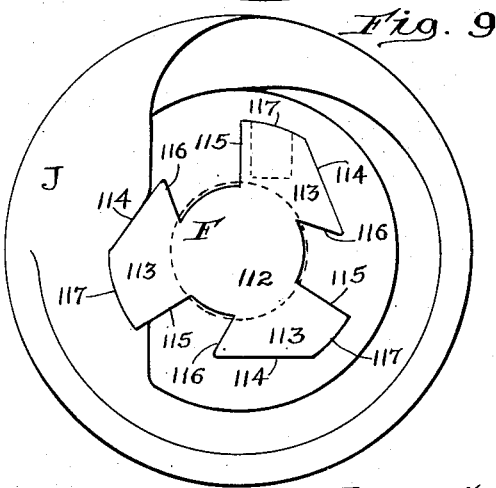
Inventor:
Roland J. Olander.
By Henry Fuchs.
Atty.

Patented July 10, 1951

2,559,731

UNITED STATES PATENT OFFICE 2,559,731

FRICTION SHOCK ABSORBER FOR RAILWAY CAR TRUCK SPRINGS

Roland J. Olander, Chicago, Ill., assignor to W. H. Miner, Inc., Chicago, Ill., a corporation of Delaware Application July 19, 1948, Serial No. 39,413

4 Claims. (Cl. 267—9)

This invention relates to improvements in friction shock absorbers, especially adapted for snubbing the action of truck springs of railway cars.

One object of the invention is to provide a friction shock absorber of the character indicated, comprising a friction shell, a cooperating friction post having sliding movement within the friction shell, and a spring surrounding the shell and post and opposing relative lengthwise movement of the same with respect to each other, wherein the post and shell have cooperating, lengthwise extending, interengaging friction surfaces held in engagement by relative rotary displacement of the post and shell with respect to each other by wedging pressure exerted against the spring.

A more specific object of the invention is to provide in a mechanism as set forth in the preceding paragraph, wedge means, acting on the spring during relative movement of the post and shell toward each other, for placing the spring under pressure to rotatively displace the post and shell with respect to each other and thereby force the friction surfaces thereof into tight frictional contact with each other.

Other objects of the invention will more clearly appear from the description and claims hereinafter following.

In the accompanying drawings forming a part of this specification, Figure 1 is a side elevational view of the improved friction shock absorber. Figure 2 is a top plan view of Figure 1. Figure 3 is a transverse, vertical sectional view, corresponding substantially to the line 3—3 of Figure 1. Figure 4 is a top plan view of the friction shell shown in Figures 1 and 3. Figure 5 is a top plan view of the wedge ring shown in Figure 1. Figure 6 is a transverse vertical sectional view, corresponding substantially to the line 6—6 of Figure 5. Figure 7 is a bottom plan view of the friction post shown in Figures 1 and 3. Figure 8 is a view similar to Figure 1, illustrating another embodiment of the invention. Figure 9 is a bottom plan view of the friction post illustrated in Figure 8.

Referring first to the embodiment of the invention illustrated in Figures 1 to 7 inclusive, my improved friction shock absorber comprises broadly a friction shell A, a friction post B, a wedge ring C, and a coiled spring D.

The friction shell A is in the form of a cylinder having a laterally outwardly projecting, annular flange at its bottom end, forming a follower member 10.

The friction post B has an annular, laterally outwardly projecting follower flange 11 at its upper end forming the base portion of the post and acting as a follower member. The post proper comprises a substantially cylindrical portion 12 and three circumferentially spaced, radially projecting wings 13—13—13 extending lengthwise thereof. Each of the wings 13 has a longitudinally extending, flat friction surface 14 thereon, which is at an angle or inclined with respect to a plane radial to the longitudinal central axis of the post. On the side opposite to the surface 14, the wing 13 presents a flat surface 15, which is radial to the central longitudinal axis of the post. This surface 15 also extends lengthwise of the wing. Each wing 13 is undercut at its inner side on the friction surface side thereof, as shown at 16, and the outer end of the wing is rounded off, as indicated at 17. The rounded surface 17 of the wing is preferably on an arc which is concentric with the cylindrical portion of the post.

The friction shell A is cut out to provide a lengthwise extending opening 18, corresponding in transverse cross section to the transverse cross section of the post B. The opening 18 has lengthwise extending walls, which present interior friction surfaces 19—19—19, which are correspondingly inclined to and cooperate with the friction surfaces 14—14—14 of the post. The post B is slidingly telescoped within the friction shell A with the friction surfaces 14—14—14 thereof slidingly engaged respectively with the surfaces 19—19—19 of said shell.

The annular flange 11 of the post is provided with an annular series of wedge projections 20—20 on its underneath side, presenting wedge faces 21—21, the wedge projections, in effect, forming an annular series of teeth.

The wedge ring C is in the form of an annulus surrounding the post and is engaged over the wings 13—13—13 thereof, being rotatably supported on the rounded ends 17—17—17 of said wings. The ring C has an annular series of upstanding wedge projections 22—22 thereon, presenting wedge faces 23—23, correspondingly inclined to and engaged with the wedge faces 21—21 of the flange 11 of the post.

The spring D is in the form of a helical coil surrounding the shell A and post B, and has its top and bottom ends bearing, respectively, on the underneath side of the wedge ring C and the top side of the flange 10 of the shell A. The top end tang of the spring is shouldered against a depending abutment 24 on the wedge ring C and the bottom end tang is shouldered against an upstanding abutment 25 on the flange 10 of the shell.

To limit lengthwise separation of the post and shell and hold the mechanism assembled, the shell A is provided with a stop pin 26 engaged through the wall of the shell and extending loosely into a lengthwise disposed slot 27 in one of the wings 13 of the post, as clearly shown in Figures 1, 2, and 3.

In the assembled condition of the mechanism, as shown in Figure 1, the wedge projections 29 of the post B are in wedging engagement with the wedge projections 22 of the ring C and the top and bottom tangs of the spring D are in bearing engagement with the abutments 24 and 25 of the ring C and shell A, respectively. Thus, any downward pressure exerted on the post produces wedging action between the ring C and the wedge projections 29 of the post, tending to rotate these parts with respect to each other. The rotation imparted to the ring C is transmitted from the latter, through the medium of the coiled spring D to the shell A. The wedging action between the post B and the ring C thus tends to produce rotary displacement in reverse directions of the post B and shell C, that is, rotary displacement of the post in contraclockwise direction with respect to the shell, as viewed in Figure 2, pressing the friction surfaces 14—14—14 of the post against the friction surfaces 19—19—19 of the shell and wedging these surfaces together, due to the inclination of the same.

My improved friction shock absorber is substituted for one or more of the coil spring units of a cluster of truck springs of a railway car, the same being interposed between the top and bottom spring follower plates of said cluster. When in applied position on the car, the shock absorber is initially in partly compressed condition due to the weight of the car thereon, thereby wedging the friction surfaces of the post and shell into tight frictional engagement with each other.

The operation of the improved shock absorber illustrated in Figures 1 to 7 inclusive is as follows: Upon the spring cluster of the railway car being compressed between the top and bottom spring follower plates of the cluster, the friction post B is forced downwardly toward the shell A against the resistance of the spring D. The desired snubbing action is thus produced during compression of the device by sliding frictional contact between the friction surfaces 14 and 19 of the post B and the shell A, the friction surfaces being held in tight contact by the wedging action between the wedge ring C and the post B, the force created by the wedging action being transmitted from the ring C through the spring D to the shell A, as hereinbefore pointed out. As compression of the mechanism progresses, the pressure exerted by the wedging action increases, due to the increasing resistance offered by the spring D, with resultant increase in the frictional resistance provided by the device. During recoil of the truck springs, expansion of the spring D returns all of the parts of the shock absorber to the normal position shown in Figure 1. As will be evident, my improved shock absorber thus provides for frictional resistance in recoil as well as compression to snub the action of the truck springs.

Referring next to the embodiment of the invention illustrated in Figures 8 and 9, my improved shock absorber, as illustrated in these figures, comprises broadly a friction shell E, a friction post F, a coil spring G, and end followers H and J on the shell and post, respectively, having wedging engagement with the end coils of the spring to force the friction shell and post into tight frictional engagement with each other.

The friction post F has an annular, laterally outwardly projecting flange at its upper end or base portion, forming the follower J. The post proper comprises a substantially cylindrical portion 112 and three radially projecting wings 113—113—113 extending longitudinally thereof. Each wing 113 has a longitudinally extending, flat friction surface 114 which is at an angle or inclined with respect to a plane radial to the longitudinal central axis of the post. On the side opposite to the surface 114, the wing presents a flat surface 115, which is radial to the central longitudinal axis of the mechanism and also extends lengthwise of the wing. Each wing 113 is undercut at its inner side on the friction surface side thereof, as indicated at 116, and the outer end of the wing is rounded off, as indicated at 117, on an arc which is concentric to the cylindrical portion of the post.

The friction shell E is similar to the friction shell A hereinbefore described in that it has an interior opening, corresponding to the opening 18 within which the post F slidingly fits. This opening of the shell E presents interior friction surfaces with which the friction surfaces 114—114—114 of the post F cooperate. At the bottom end thereof, the shell E has an annular flange or base, which forms the follower H, which is similar to the follower J of the post. The follower J presents a wedge surface 129 on its inner side, which engages the coil at the upper end of the spring, the surface 129 having substantially the same pitch as said end coil. The follower J is cut out, as indicated at 128, at the inner end of the wedge surface 129 and wedge faces 130 and 131 are presented by this cut out portion, which wedge faces are continuations of the surface 129 and are at a slight angle to each other. The remainder of the wedge surface 129 is preferably slightly concave, as indicated at 133. At the inner end of the face 130 of the cut out portion, the follower J presents an abutment face 132 which acts as a limiting stop for the tang at the top end of the spring G.

The follower H of the shell E is similar to the follower J, having a wedge surface 229 in all respects similar to the surface 129 of the follower J, but reversely arranged so as to properly cooperate and have wedging engagement with the lower end coil of the spring.

The spring G is in the form of a helical coil surrounding the shell E and post F. The spring G has its top and bottom ends bearing respectively on the underneath side of the follower J of the post F and the top side of the follower H of the shell E in wedging engagement with the wedge surfaces 129 and 229 of these followers. The inclined outer surface of the bottom coil of the spring, which coil is indicated by 134, is in wedging engagement with the wedge surface 229 and the inclined outer surface of the top coil, which coil is indicated by 135, is in wedging engagement with the wedge surface 129 of the follower H. In compression of the mechanism, the wedging action between the followers H and J and the spring G tends to rotate the post and shell in reverse directions, the post being rotated in clockwise direction, as viewed in Figure 9, and the shell E in a reverse direction, thus pressing the friction surfaces of the post and shell tightly together.

The operation of the shock absorber shown in Figures 8 and 9 is substantially the same as the operation of the mechanism shown in Figures 1 to 7 inclusive, with the exception that the force to press the shell and post together is provided by wedging action directly between the spring and followers of the shell and post, instead of between the ring C and follower flange 11 of the post.

I claim:

1. In a friction shock absorber, the combination with a friction shell; of a friction post slidingly telescoped within the shell, said post and shell having interengaging, lengthwise extending straight portions provided with cooperating straight friction surfaces; a rotatably displaceable member surrounding the outer end portion of said post; a coil spring surrounding said shell and post and having shouldered engagement with said shell and member to yieldingly oppose relative lengthwise movement thereof toward each other, and transmit rotary motion from one to the other; and means on said post for wedging said member in rotary direction against said spring, as the post is moved inwardly of the shell, to press the friction surfaces of said shell and post into tight frictional contact with each other.

2. In a friction shock absorber, the combination with a friction shell member; of a friction post member slidingly telescoped within the shell member, said post and shell members having interengaging, lengthwise extending straight portions provided with cooperating straight friction surfaces; a coil spring surrounding said shell and post members and yieldingly opposing relative lengthwise movement thereof; a radially extending stop shoulder on one of said members against which the end of the tang at one end of the spring abuts; a rotary wedge element at the outer end of the other of said members; a radial shoulder on said element with which the tang at the other end of the spring has shouldered engagement; and wedge means on said last named member for wedging said element in rotary direction to force said spring against said stop shoulder to press said friction surfaces of said shell and post members into tight frictional contact with each other.

3. In a friction shock absorber, the combination with a friction shell member; of a friction post member slidingly telescoped within the shell member, said shell and post members having interengaging, lengthwise extending straight portions provided with cooperating straight friction surfaces; a coil spring surrounding said shell and post members and yieldingly opposing relative lengthwise movement thereof; a radially extending stop shoulder on one of said members against which the end of the tang at one end of the spring abuts; a wedge ring in wedging engagement with the other of said members; and a radially extending stop shoulder on said wedge ring against which the end of the tang at the other end of the spring abuts.

4. In a friction shock absorber, the combination with a friction shell member having a follower flange at the outer end thereof; of a friction post member having a follower flange at the outer end thereof, said post member being slidingly telescoped within the shell member, said shell and post members having interengaging, lengthwise extending straight portions provided with cooperating straight friction surfaces; a wedge ring surrounding one of said members, said wedge ring having rotary wedging engagement with the follower of said last named member; a coil spring surrounding said shell and post members and yeildingly opposing relative lengthwise movement thereof, said spring bearing at one end on said ring and at its other end on the follower flange of the other of said members, said last named follower flange having a radial stop shoulder thereon against which the end of the tang at said end of the spring bears; and a radial stop shoulder on said wedge ring against which the end of the tang at the corresponding end of the spring bears.

ROLAND J. OLANDER.

REFERENCES CITED

The following references are of record in the file of this patent:

UNITED STATES PATENTS

| Number | Name | Date |
| --- | --- | --- |
| 776,202 | Pulliam | Nov. 29, 1904 |
| 1,761,272 | O'Connor | June 3, 1930 |
| 1,894,717 | Sproul | Jan. 17, 1933 |
| 2,000,905 | Rockefeller | May 14, 1935 |
| 2,441,621 | Dentler | May 18, 1948 |